(12) United States Patent
Zhang et al.

(10) Patent No.: US 6,379,167 B1
(45) Date of Patent: Apr. 30, 2002

(54) MULTIMEDIA CARD ELECTRICAL CONNECTOR WITH AN IMPROVED EJECTOR MECHANISM

(75) Inventors: JianQiang Zhang; ZhengHua Xu, both of KunSan (CN); DuanZheng Xu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/695,099

(22) Filed: Oct. 23, 2000

(30) Foreign Application Priority Data

Jun. 9, 2000 (TW) ...................................... 89209808 U

(51) Int. Cl.⁷ .............................................. H01R 13/62
(52) U.S. Cl. ...................................... 439/157; 439/159
(58) Field of Search ........................ 439/157, 152–156, 439/158–160, 372, 326–329, 630–634

(56) References Cited

U.S. PATENT DOCUMENTS

| | | | | |
|---|---|---|---|---|
| 5,374,198 A | * | 12/1994 | Nagata | 439/157 |
| 5,492,480 A | * | 2/1996 | Fusselman et al. | 439/157 |
| 5,503,564 A | * | 4/1996 | Futatsugi et al. | 439/157 |
| 5,564,936 A | * | 10/1996 | David et al. | 439/159 |

* cited by examiner

Primary Examiner—Hien Vu
(74) Attorney, Agent, or Firm—Wei Te Chung

(57) ABSTRACT

A multimedia card electrical connector (1) includes an insulative housing (10), a plurality of terminals (12) and an ejector mechanism (13) mounted on the housing The ejector mechanism has a push-rod (130) forming an actuator (135) at an end section thereof, a rotatable bifurcated cam (132) defining an edge (141) at an end thereof, a torsional spring (131) engaging with the cam and a compression spring (133) encircling the push-rod. A front side of a multimedia card (2) inserted into the connector pushes an ejecting tab (140) of the cam against a force of the torsional spring and the push-rod is permitted to move to a rearward position. At this position, the edge of the cam abuts against a side the actuator, which serves to prevent a pivotal movement of the cam which would eject the inserted card out of the insulative housing. To eject the card, the push-rod is forwardly pushed by an external force so that the actuator is disengaged from the cam. The torsional spring then urges the cam to its initial state and at the same time the cam ejects the multimedia card out of the insulative housing.

16 Claims, 4 Drawing Sheets

MULTIMEDIA CARD ELECTRICAL CONNECTOR WITH AN IMPROVED EJECTOR MECHANISM

FIELD OF THE INVENTION

The present invention relates to an electrical connector, and particularly to a multimedia card electrical connector having an ejector mechanism for use in mobile communications or for ejecting memory cards or the like.

BACKGROUND OF THE INVENTION

Recently, the demand for small-sized electrical cards for use in mobile phones has been increasing. Electrical connectors of a corresponding thinness, and having an ejector mechanism disposed to allow easy removal of the card, are also, therefore, increasingly required.

Most conventional electrical connectors have a lever-type ejector mechanism. Such ejector mechanisms include at least three parts, specifically, a one-piece eject lever received in a slide slot, a one-piece actuator transversely mounted in a housing of the connector, and a pair of pivot fulcrums fixing the one-piece actuator to the housing. An ejector mechanism having the above-mentioned design is inevitably thick or long. Furthermore, an ejector mechanism utilizing only the operating principle of a lever requires a strong force to actuate it, which makes operation difficult. Additionally, if the applied force is too large, the eject lever may disengage from a side of the housing or may even damage the slide slot.

Hence, an improved electrical connector is needed to overcome the above-mentioned deficiencies of current electrical connectors. This invention is directed to providing a low profile, simplified and effective ejector mechanism for a multimedia card or the like.

SUMMARY OF THE INVENTION

Accordingly, the primary object of the present invention is to provide a multimedia card electrical connector for use in mobile communications, and particularly an electrical connector having a convenient, flexible ejector mechanism.

A multimedia card electrical connector in accordance with the present invention comprises an insulative housing, a plurality of terminals received in the insulative housing, and an ejector mechanism mounted in a side of the insulative housing. The ejector mechanism comprises an elongated push-rod received in the housing and a bifurcated cam pivotably mounted on the housing and adjacent an end of the push-rod. The push-rod has an actuator and a push button respectively formed at opposite end sections thereof. The bifurcated cam includes two bands forming an acute angle therebetween. A torsional spring is mounted on the cam to actuate the cam, and a compression spring circles the push-rod.

The torsional spring is relaxed and the compression spring is compressed in an initial state. When a multimedia card is inserted into the connector, a front side of the multimedia card pushes an ejecting tab of the cam , the torsional spring is compressed by the cam, at the same time the compression spring is released and pushes the push-rod rearward so that the cam is locked by the push-rod, which serves to prevent a releasing of the cam which would eject the inserted multimedia card out of the insulative housing An edge of a band of the cam abuts against a side of the actuator of the push-rod and the card electrically engages with the terminals of the electrical connector.

When the push-rod is pushed forward by an external force, the actuator releases the edge of the cam and the push-rod disengages from the cam. The torsional spring pushes the cam outward, and the cam rotates and ejects the multimedia card out of the insulative housing.

Other objects, advantages and novel features of the invention will become more apparent from the following detailed description when taken in conjunction with the accompanying drawings.

DETAILED DESCRIPTION OF THE INVENTION

Reference will now be made in detail to the preferred embodiment of the present invention.

Figure 1:
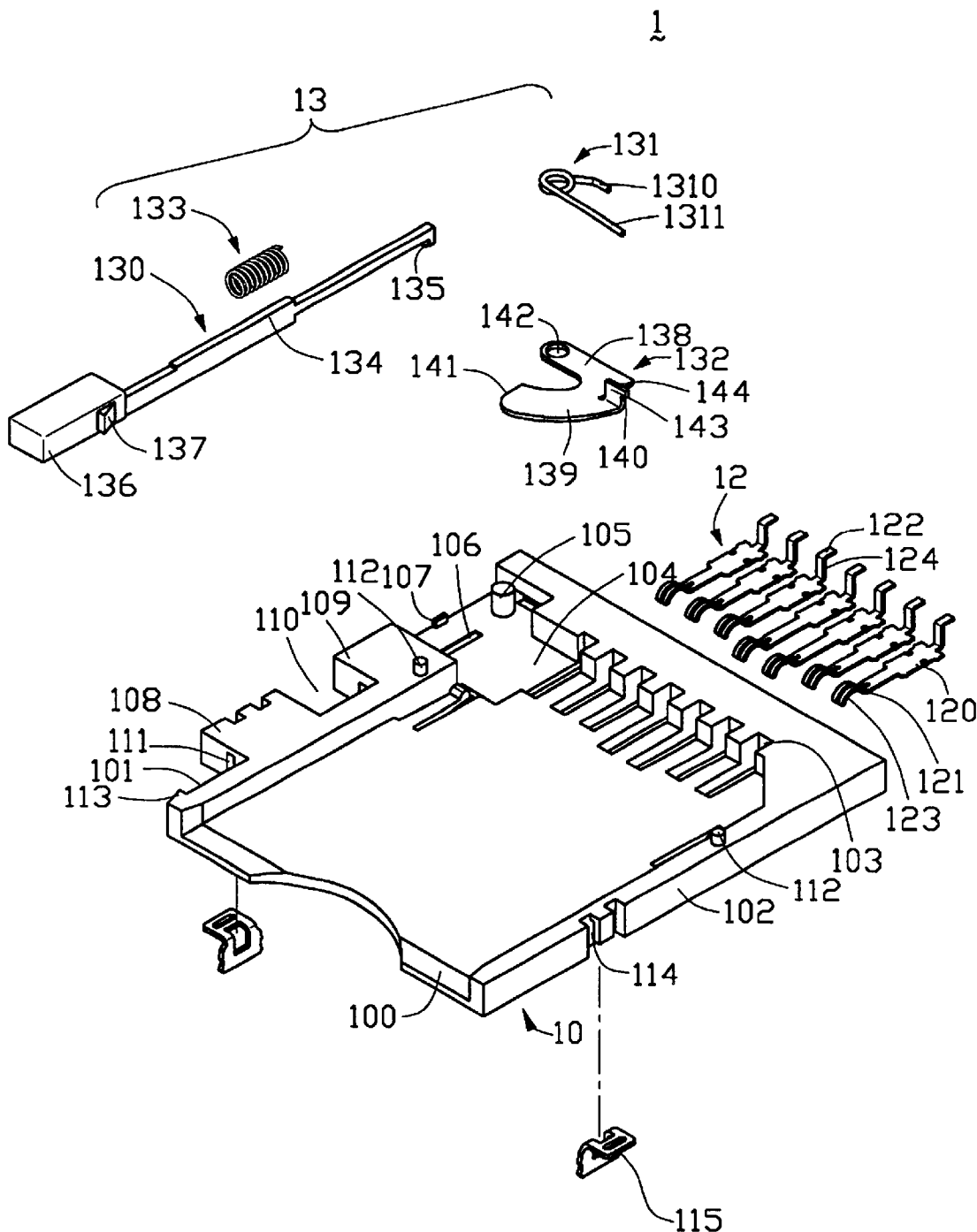
FIG. 1 is an exploded view of a multimedia card electrical connector in accordance with the present invention.

Referring to FIG. 1, a multimedia card electrical connector 1 in accordance with the present invention comprises an insulative housing 10, a plurality of terminals 12 and an ejector mechanism 13 both mounted on the insulative housing 10.

Figure 3:
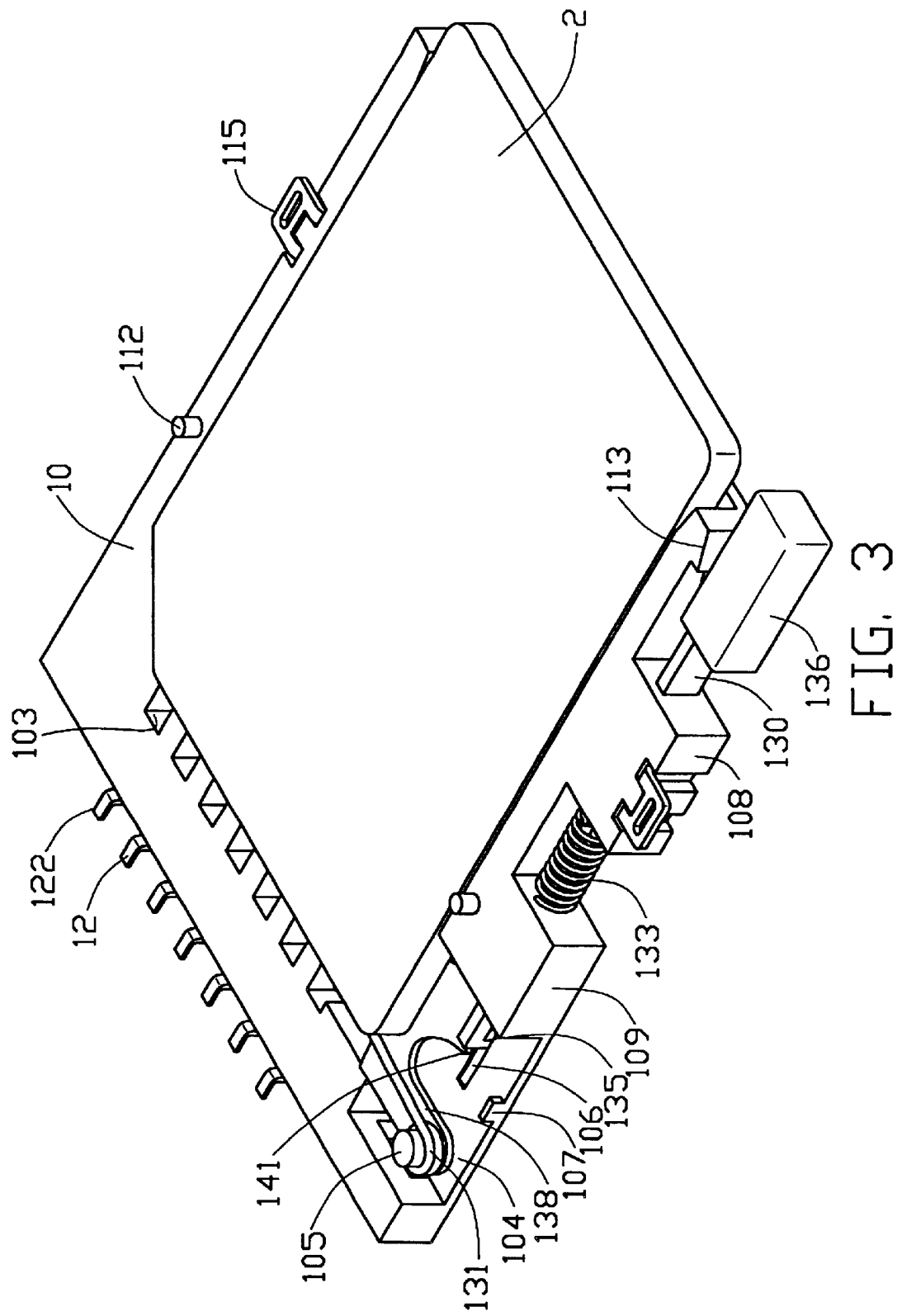
FIG. 3 is a perspective view of a multimedia card being inserted into the multimedia card electrical connector.

The insulative housing 10 includes a lower surface 100, a first side 101 and a second side 102, with a receiving space defined therebetween for receiving a multimedia card 2 (as FIG. 3 shows). A cavity 104 is formed in the lower surface 100 at a front end section of the first side 101 near the terminals 12. A pivot boss 105 projects from a bottom of the cavity 104. An elongated guiding slot 106 is defined in the bottom of the cavity 104 and extends along the first side 101. A locating block 107 is formed at an outward edge of the cavity 104. A first and a second blocks 108, 109 extend from an outward surface of the first side 101 of the insulative housing 10, and each defines a guiding hole 111 extending therethrough and aligned with the guiding slot 106 of the cavity 104. A slot 110 is formed between the first block 108 and the second block 109. A plurality of passageways 103 is defined in an upper side of the lower surface 100 for receiving terminals 12 therein. A pair of cutouts 114 is respectively defined in the second side 102 and in the first block 108 for receiving welding bars 115. The housing 10 further includes a pair of mounting bosses 112 respectively extending from upper surfaces of the first and the second sides 101,102 for insertion into corresponding mounting holes in a printed circuit board (not shown).

Each terminal 12 comprises a locating portion 120 for fixing the terminal in the housing 10, a contact portion 121 on one end with an arcuate protrusion 123 thereon, and a welding tip 122 on an opposite end of the locating portion 120. A vertical spring arm 124 is formed between the welding tip 122 and the locating portion 120. The arcuate protrusion 123 is formed on the contact portion 121 and extends out of the lower surface 100 for electrically connecting with the multimedia card 2 inserted into the multimedia card electrical connector 1.

An ejector mechanism 13 comprises a push-rod 130 received in the housing, a torsional spring 131, a compression spring 133 and a bifurcated cam 132 pivotally mounted on the housing. The push-rod 130 includes an actuator 135 at a front end thereof near the terminals and a push button 136 at a rear end thereof. A bar 134 is formed at a middle of the push-rod 130 with a front face abutting against the compression spring 133. A wedge 137 extends from a side of the push button 136 and a wedge 113 extends from the first side 101 of the insulative housing 10 for engaging with each other. The bifurcated cam 132 has a first band 138 and a second band 139. An arcuate edge 141 is formed at an end of the second band 139. A pivot hole 142 is defined adjacent an end of the first band 138 for receiving the pivot boss 105 of the cavity 104. An ejecting tab 140 extends upwardly and perpendicularly from the cam 132 and has a front face 144 and a rear face 143 opposite to each other. The torsional spring 131 has a short arm 1310 and a long arm 1311.

Figure 2:
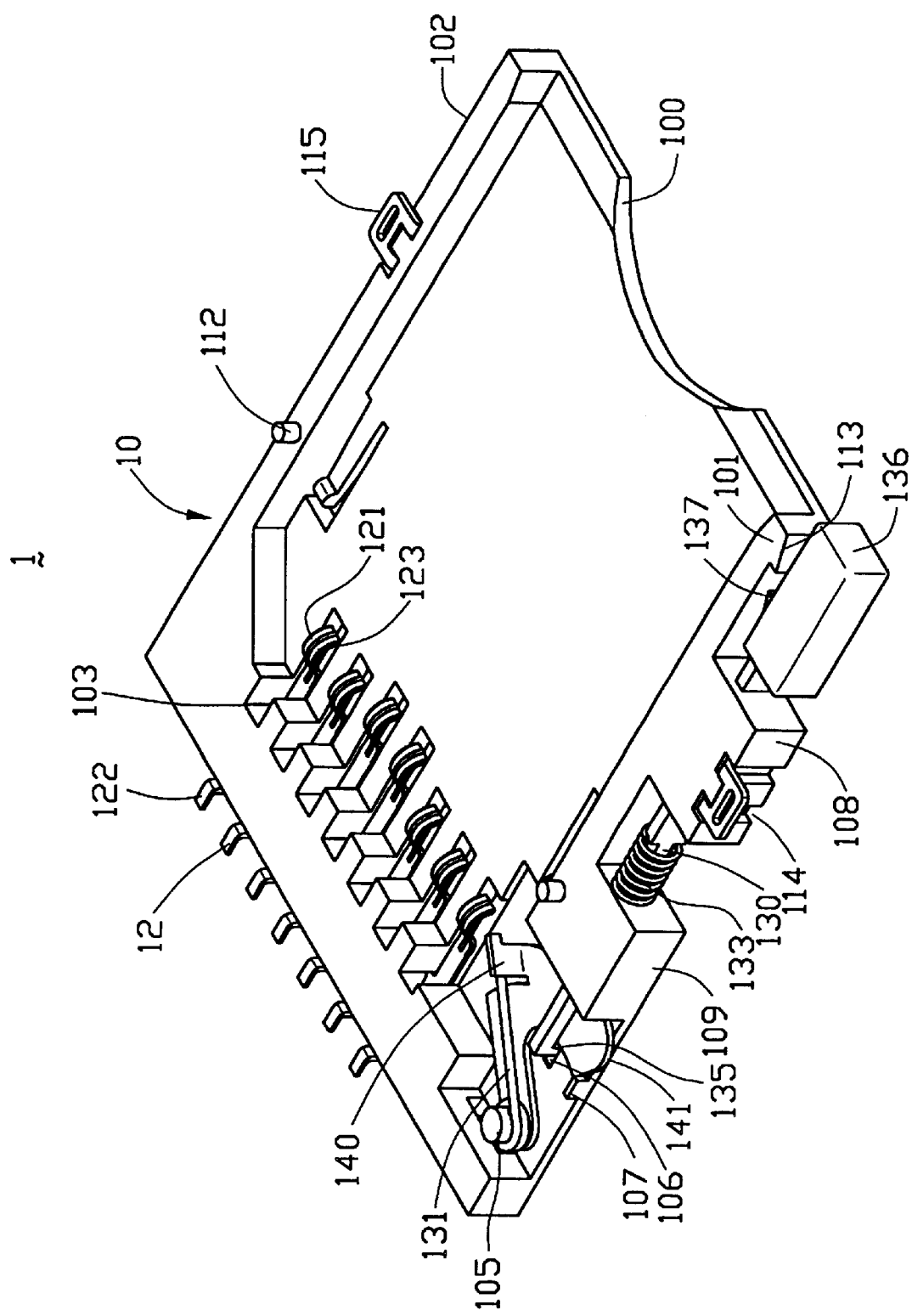
FIG. 2 is an assembled view of a multimedia card electrical connector at an initial state.

Referring to FIGS. 1 and 2, in assembly, the push-rod 130 is inserted through the guiding holes 111 of the first and the second blocks 108, 109 of the first side 101. The compression spring 133 encircles the push-rod 130 and is disposed between a front end of the bar 134 and a rear side of the second block 109. The torsional spring 131 encircles the pivot boss 105 and is disposed on the first band 138 with the short arm 1310 of the torsional spring 131 abutting against a wall of the cavity 104 and the long arm 1311 engaging with the front face 144 of the ejecting tab 140. In the initial state, the torsional spring 131 is relaxed and the compression spring 133 is compressed. The actuator 135 is received in the guiding slot 106 for insuring that the push-rod 130 slides in the front-to-back direction in a guided manner. The second band 139 extends through a space between a forward side of the second block 109 and the actuator 135, with the edge 141 thereof abutting against the locating block 107.

Figure 4:
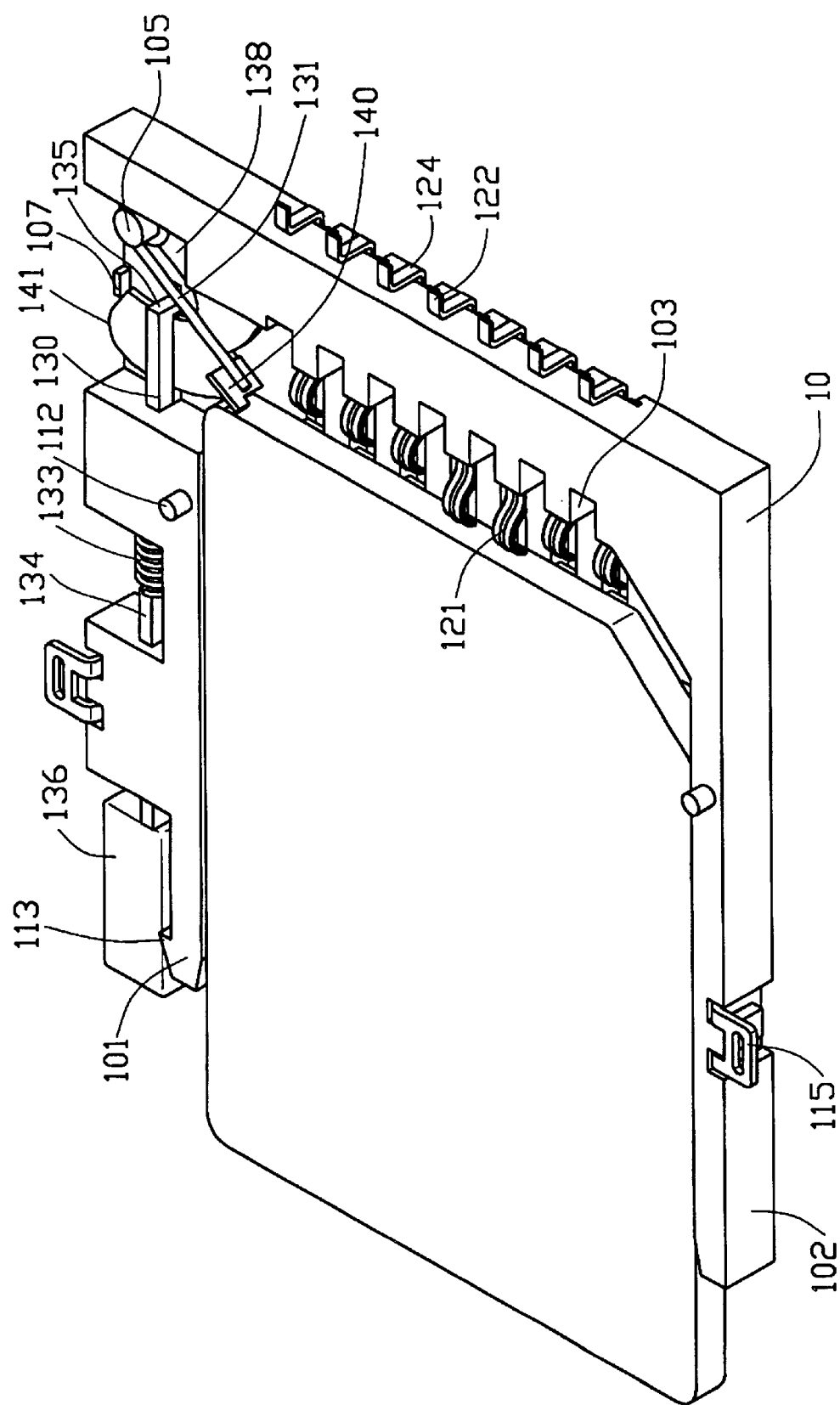
FIG. 4 is a perspective view of a multimedia card being ejected out of the multimedia card electrical connector.

Referring to FIGS. 1 and 3, when a multimedia card 2 is inserted into the multimedia card electrical connector 1, the rear face 143 of the ejecting tab 140 is pushed by the multimedia card 2 and the cam 132 is moved about the pivot boss 105. The long arm 1311 of the torsional spring 131 rotates around the pivot boss 105 along with the cam 132. The long arm 1311 of the torsional spring 131 is pushed toward the short arm 1310, compressing the torsional spring 131. The second band 139 moves from between the actuator 135 and the second block 109 and the compression spring 133 relaxes, driving the push-rod 130 rearwardly. The edge 141 of the cam 132 abuts against a side of the actuator 135, which serves to prevent a movement of the cam 132 tending to eject the inserted card 2 out of the insulative housing 10. The wedges 113, 137 engage with each other, preventing the push-rod 130 from slipping out of the guiding holes 111. Thus, the multimedia card 2 is inserted into the housing 10 and electrically engages with the terminals 12 of the multimedia card electrical connector Referring to FIGS. 1 and 4, when the push button 136 of the push-rod 130 is pushed forwardly by an external force, the actuator 135 of the push-rod 130 is driven to slide forwardly along the guiding slot 106 of the cavity 104, producing a space between the actuator 135 and the second block 109 for admitting entrance of the second band 139 of the cam 132 therebetween. With the actuator 135 disengaging from the edge 141 of the cam, the torsional spring 131 releases the stored energy of its compressed state and generates an elastic force which urges the front face 144 of the cam 132 to move around the pivot boss 105, and the band 139 extends through the space between the actuator 135 and the second block 109 until the second band 139 abuts against the locating block 107. In this state, the compression spring 133 is compressed as FIG. 2 shows. The multimedia card 2 can thus be pushed out of the multimedia card electrical connector 1 by the rear face 143 of the ejecting tab 140 of the cam 132.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An electrical connector for receiving an electrical card therein, comprising:
    an insulative housing;
    a plurality of terminals received in the housing; and
    an ejector mechanism comprising:
        a push-rod received in the housing;
        a first elastic member urging the push-rod rearwardly;
        a second elastic member mounted to the insulative housing; and
        a cam pivotably mounted on the housing and urged by the second elastic member to engage with the push-rod, the cam being moveable by an inserted card to permit a rearward movement of the push-rod which in turn serves to prevent a movement of the cam tending to eject the inserted card out of the insulative housing;
    wherein a front end of a first side of the insulative housing comprises a cavity, a pivot boss projecting from a bottom of the cavity, an elongated guiding slot defined in the bottom of the cavity and a locating block at an outward edge of the cavity for retaining the cam in the housing, and wherein a first block and a second block are formed on an outward surface of said first side of the insulative housing and each block defines a guiding hole in alignment with the elongated guiding slot.

2. The electrical connector in accordance with claim 1, wherein said push-rod is forwardly actuatable to disengage from the cam and the cam is then urged by the second elastic member to eject the inserted card out of the insulative housing.

3. The electrical connector in accordance with claim 1, wherein a slot is defined between said first and second block for receiving said first elastic member.

4. The electrical connector in accordance with claim 1, wherein said push-rod comprising an actuator at a front end thereof, a push button ata rear end thereof, and a bar at a middle thereof, the bar having a front face abutting against said first elastic member.

5. The electrical connector in accordance with claim 4, wherein said first elastic member is provided between the bar and a rear side of the second block and encircles the push-rod.

6. The electrical connector in accordance with claim 4, wherein a pair of wedges respectively extends from a side of the push button and said first side of the insulative housing.

7. The electrical connector in accordance with claim 4, wherein said cam has two bands, one of the two bands defining a pivot hole adjacent an end thereof for receiving the pivot boss and the other band defining an edge at an end thereof for interacting with the actuator of said push-rod.

8. The electrical connector in accordance with claim 1, wherein said cam comprises an ejecting tab having a front face engaging with said second elastic member and a rear face for engaging with the inserted card.

9. The electrical connector in accordance with claim 1, wherein said first elastic member is a compression spring and said second elastic member is a torsional spring having two arms.

10. An ejector mechanism adapted for mounting in a housing of an electrical connector for an electrical card, comprising:

a push-rod receiving in the housing, the push-rod comprising an actuator at a front end thereof, a push button at a rear end thereof, and a bar at a middle thereof, the bar having a front face abutting against said first elastic member;

a first elastic member urging the push-rod rearwardly;

a second elastic member mounted to the housing; and a cam pivotally mounted on the housing and urged by the second elastic member to engage with the push-rod, the cam having two bands, one of the two bands defining a pivot hole adjacent an end thereof for receiving a pivot boss on the housing of the electrical connector and the other band defining an edge at an end thereof for interacting with the actuator of said push-rod, the cam being movable by an inserted card to permit a rearward movement of the push-rod which in turn serves to prevent a movement of the cam tending to eject the insert card out of the insulative housing.

11. The ejector mechanism in accordance with claim 10, wherein said push-rod is forwardly actuatable to disengage from the cam and the cam is then urged by the second elastic member to eject the inserted card out of the insulative housing.

12. The ejector mechanism in accordance with claim 10, wherein said-push rod is mounted in a guiding slot of a side of the housing defining a slot receiving said first elastic member between the bar and the housing.

13. The ejector mechanism in accordance with claim 10, wherein said cam comprises an ejecting tab having a front face engaging with said second elastic member and a rear face for engaging with the inserted card.

14. The ejector mechanism in accordance with claim 10, wherein said first elastic member is a compression spring and said second elastic member is a torsional spring having two arms.

15. The ejector mechanism in accordance with claim 10, wherein said cam has two bands, one band defining a pivot hole adjacent an end of the band for holding a pivot boss of the housing.

16. A connector for use with an electronic card, comprising:

an insulative housing;

a plurality of terminals received in the housing;

a push-rod linearly moveable relative to the housing, said push-rod including a push button at a rear end thereof;

a first elastic member urging the push-rod rearwardly;

a cam pivotally mounted to the housing; and a second elastic member having two arms urging the can to rotate rearwardly;

wherein when the card is forwardly inserted into and successively received within the housing, the second elastic member is compressed and the push-rod is moved rearwardly by relaxation of the first elastic member and abuts against the cam for preventing the cam from rotating rearwardly caused by resilient force of the second elastic member; and when the push-rod is forced to compress the first elastic member and move forwardly to disengage the cam, said cam is rearwardly rotated due to the second elastic member to reject the inserted card and further engages the push-rod to prevent the push-rod from moving rearwardly caused by resilient force of the first elastic member; wherein a pair of wedges respectively extends from a side of the push button and a side of the insulative housing.

* * * * *